United States Patent
Sun et al.

(10) Patent No.: US 10,245,773 B2
(45) Date of Patent: Apr. 2, 2019

(54) METHOD FOR MOLDING TWO-PIECE BLOW MOLDED HOLLOW TANK BY USING AUXILIARY MALE MOLDS

(71) Applicant: YAPP AUTOMOTIVE PARTS CO., LTD, Yangzhou, Jiangsu Province (CN)

(72) Inventors: Yan Sun, Yangzhou (CN); Lin Jiang, Yangzhou (CN); Songjun Xu, Yangzhou (CN); Liang Liu, Yangzhou (CN); Dejun Gao, Yangzhou (CN); Ye Wang, Yangzhou (CN); Lushun Wu, Yangzhou (CN); Jie Li, Yangzhou (CN); Weidong Su, Yangzhou (CN); Changru Wang, Yangzhou (CN); Xiaojun Li, Yangzhou (CN); Quanzhou Yang, Yangzhou (CN)

(73) Assignee: YAPP AUTOMOTIVE PARTS CO., LTD. (CN)

( * ) Notice: Subject to any disclaimer, the term of this patent is extended or adjusted under 35 U.S.C. 154(b) by 1011 days.

(21) Appl. No.: 14/376,597

(22) PCT Filed: Jun. 8, 2013

(86) PCT No.: PCT/CN2013/077015
§ 371 (c)(1),
(2) Date: Aug. 4, 2014

(87) PCT Pub. No.: WO2014/180018
PCT Pub. Date: Nov. 13, 2014

(65) Prior Publication Data
US 2015/0314514 A1    Nov. 5, 2015

(30) Foreign Application Priority Data
May 6, 2013    (CN) .......................... 2013 1 0161984

(51) Int. Cl.
*B29C 49/00*    (2006.01)
*B29C 49/18*    (2006.01)
(Continued)

(52) U.S. Cl.
CPC .......... *B29C 49/0047* (2013.01); *B29C 49/18* (2013.01); *B29C 49/20* (2013.01);
(Continued)

(58) Field of Classification Search
CPC ..... B29C 49/0047; B29C 49/18; B29C 49/20; B29C 49/4247; B29C 49/4252;
(Continued)

(56) References Cited

U.S. PATENT DOCUMENTS

| | | | |
|---|---|---|---|
| 4,239,727 A * | 12/1980 | Myers | B29C 51/002 264/321 |
| 2007/0029329 A1 | 2/2007 | Dubois et al. | |
| 2012/0152449 A1 * | 6/2012 | Watanabe | B29C 51/12 156/245 |

FOREIGN PATENT DOCUMENTS

| | | |
|---|---|---|
| CN | 101497238 A | 8/2009 |
| CN | 101733933 A | 6/2010 |

(Continued)

OTHER PUBLICATIONS

State Intellectual Property Office of P. R. China (ISR/CN), "International Search Report", for International application No. PCT/CN2013/077015, dated Jan. 16, 2014, China.

*Primary Examiner* — Robert J Grun
(74) *Attorney, Agent, or Firm* — PROI Intellectual Property US (57) ABSTRACT

A method for molding a two-piece blow molded hollow tank by using auxiliary male molds includes the following steps: 1) blanking two parisons; 2) closing mold halves of a mold and a pre-molding template; 3) pre-stretching the molten (Continued)

parisons by using auxiliary male molds in the pre-molding template; 4) performing internal high-pressure blow molding, and pre-molding two housing portions; 5) opening the mold, and withdrawing the pre-molding template; 6) moving in a component built-in mechanism to perform built-in component connection; 7) moving out the component built-in mechanism; 8) closing the mold for the second time and finally blow molding a hollow tank; and 9) opening the mold and taking out the product.

10 Claims, 5 Drawing Sheets (51) Int. Cl.
  *B29C 49/20* (2006.01)
  *B29C 49/42* (2006.01)
  *B29L 31/00* (2006.01)
  *B29C 49/04* (2006.01)

(52) U.S. Cl.
  CPC ...... *B29C 49/4247* (2013.01); *B29C 49/4252* (2013.01); *B29C 49/04* (2013.01); *B29C 2049/2008* (2013.01); *B29C 2049/2073* (2013.01); *B29C 2049/2082* (2013.01); *B29L 2031/7172* (2013.01)

(58) Field of Classification Search
  CPC ............ B29C 49/04; B29C 2049/2008; B29C 2049/2073; B29C 2049/2082; B29L 2031/7172
  See application file for complete search history.

(56) References Cited

FOREIGN PATENT DOCUMENTS

| CN | 201922604 U | 8/2011 |
|---|---|---|
| CN | 102896764 A | 1/2013 |

* cited by examiner

METHOD FOR MOLDING TWO-PIECE BLOW MOLDED HOLLOW TANK BY USING AUXILIARY MALE MOLDS

BACKGROUND OF THE INVENTION

Field of the Invention

The present invention relates to a method for molding a blow molded hollow body, and in particular, to a method for molding a two-piece blow molded hollow body by using auxiliary male molds, and is particularly applicable to the field of manufacturing fuel tanks by blow molding.

Related Art

The HDPE 6-layer co-extrusion blow molding technology with an EVOH fuel barrier layer is currently a mainstream technology for manufacturing a plastic fuel tank. As environmental protection consciousnesses of governments around the world are enhanced, related policies and regulations make strict requirements on automobile main engine factories. For example, California in USA issued the PZEV, that is, Partial Zero Emission Vehicle regulations. As far as a plastic fuel tank produced by using the mainstream technology is concerned, the total evaporative emission of the plastic fuel tank includes evaporative emission of gasoline on the fuel tank body, the welding surface, the assembly part, and the sealing part, which is generally several hundred mg/24 h, so the PZEV emission standard is very rigorous for the plastic fuel tank. Meanwhile, the main engine factory needs to improve the listening capability on the noise caused due to fuel shaking inside the fuel tank under the background noise, so a large-scale dashboard structure needs to be carried inside the fuel tank, and therefore a larger technique design freedom is required.

In order to achieve these objectives, for example, Patent PCT/CN2012/081100 relates to a method in which while the device and product costs can be reduced, the product quality and the tooling design freedom are improved, the evaporative emission load of the hollow tank is reduced, and large-scale components such as a dashboard built-in valve tube may be built in the hollow tank. For a plastic fuel tank, it is generally required that the minimum wall thickness cannot be less than 3 mm, and the thickness of the welding surface is not less than 3.5 mm. Moreover, it is more difficult for an area which is stretched greatly to conform to such wall thickness requirement, and in consideration of the unit cost of a product, the wall thickness of parisons cannot be excessively increased, so the conventional method for controlling the wall thickness of a two-piece parison neck mold cannot effectively adjust the wall thickness of the local area which is stretched greatly to conform to the minimum wall thickness requirement. In order to further improve the product quality, a fuel tank with a more complex shape and a protruding local height is molded based on two-piece blow molding, and to improve the wall thickness distribution uniformity and to reduce the product weight and the unit cost are problems to be solved urgently.

SUMMARY OF THE INVENTION

In view of the technical problems existing in the prior art, the present invention provides a method for molding a two-piece blow molded hollow tank by using auxiliary male molds, which is simple in structure, convenient in operation, and low in cost, where in the method, blow molding may be performed on a two-piece hollow tank by using a large-scale built-in component, molten plastic parisons are partially pre-stretched and then molded by using vacuum or atmospheric pressure, and a fuel tank may be molded with a larger stretching ratio and a more uniform wall thickness distribution, so that a larger design freedom is achieved for the shape of the fuel tank and higher product molding quality is achieved.

In order to achieve the foregoing objective, a technical solution of the present invention is as follows: a method for molding a two-piece blow molded hollow tank by using auxiliary male molds, where the molding method includes the following steps:

1) blanking two parisons, where the two parisons after being blanked are separately located at an intermediate location between a two-piece mold and a pre-molding template;

2) closing mold halves of the mold and the pre-molding template;

3) pre-stretching the molten parisons by using auxiliary male molds in the pre-molding template;

4) performing internal high-pressure blow molding, and pre-molding two housing portions;

5) opening the mold, and withdrawing the pre-molding template;

6) moving in a component built-in mechanism to perform built-in component connection;

7) moving out the component built-in mechanism;

8) closing the mold for the second time and finally blow molding a hollow tank; and 9) opening the mold and taking out the product.

As an improvement of the present invention, the auxiliary male molds in the pre-molding template in the step 3 are set as a split-type structure, and a specific step of the setting is as follows: 31) after the mold halves of the mold and the pre-molding template are closed, an actuating mechanism drives the auxiliary male molds to move toward a direction of an inner wall of a mold cavity, so as to perform pre-stretching on the parisons, where the actuating mechanism includes an air cylinder, an oil cylinder or an electromotive mechanism.

Further, as an improvement of the present invention, the auxiliary male molds in the pre-molding template in the step 3 are set as a split-type structure, and a specific step of the setting is as follows: 31) after the mold halves of the mold and the pre-molding template are closed, the parisons are adsorbed in the mold in vacuum, and at the same time of the adsorption, an actuating mechanism drives the auxiliary male molds to move toward a direction of an inner wall of a mold cavity, so as to perform pre-stretching on the parisons, where the actuating mechanism includes an air cylinder, an oil cylinder or an electromotive mechanism. The actuating mechanism drives the auxiliary male molds to move toward the direction of the inner wall of the mold cavity, and the molten parisons are pre-stretched under push of the auxiliary male molds, so as to perform pre-stretching on the parisons; the pre-stretching is performed on the parisons by using the auxiliary male molds, and when the auxiliary male molds move to the inner wall of the mold cavity, a required parison area is first pre-stretched by using the auxiliary male molds, once the parisons contact the auxiliary male molds, because the molten parisons are pre-stretched under the action of good sliding and friction behaviors between the molten parisons and the auxiliary male molds, good wall thickness distribution can be kept, so as to overcome the problem in the prior art that wall thicknesses of places where the parisons are stretched greatly are inconsistent and mold a fuel tank with a more complex shape and a larger stretching ratio. While the mold cavity is vacuumized, the molten parisons are pushed to move to the inner wall of the mold cavity to pre-stretch the parisons. After the pre-stretching action is completed, the parisons inside the fuel tank begin to be subjected to blow molding by using a high-pressure gas, so that the parisons attach the inner surface of the mold cavity, so as to obtain two housing portions attaching the inner sides of the mold halves of the mold.

As an improvement of the present invention, the auxiliary male molds in the pre-molding template in the step 3 are set as an integral-type structure, and specific steps of the setting are as follows: 31) in a process that the mold halves of the mold and the pre-molding template are closed, the mold halves of the mold extrude the parisons to the auxiliary male molds in the pre-molding template, and after the parisons contact the auxiliary male molds, the parisons are stretched, that is, to perform pre-stretching on the parisons; and 32) after the mold halves of the mold and the pre-molding template are closed, the sheet-shaped parisons are blanked.

Further, as an improvement of the present invention, the auxiliary male molds in the pre-molding template in the step 3 are set as an integral-type structure, and the setting further includes the following step: 33) after the blanking, adsorbing the parisons in the mold in vacuum. In the foregoing technical solution, after the pre-molded mold halves of the mold and the pre-molding template are completely closed, the auxiliary stretching process is completed, and this auxiliary stretching is performed mainly because the mold halves of the mold extrude the parisons to the auxiliary male molds in the pre-molding template; once the parisons contact the auxiliary male molds, because the molten parisons are pre-stretched under the action of good sliding and friction behaviors between the molten parisons and the auxiliary male molds, good wall thickness distribution can be kept, and a fuel tank with a complex shape and a large height can be better molded, so as to better satisfy the minimum wall thickness requirement of the places where the parisons are stretched greatly.

As an improvement of the present invention, the auxiliary male molds in the pre-molding template in the step 3 are set as a split-type structure which is merged together, and a specific step of the setting is as follows: 31) after the mold halves of the mold and the pre-molding template are closed, the parisons are adsorbed in the mold in vacuum, and at the same time of the adsorption, an actuating mechanism drives the auxiliary male molds to move toward a direction of an inner wall of a mold cavity, so as to perform pre-stretching on the parisons.

Further, as an improvement of the present invention, the auxiliary male molds in the pre-molding template in the step 3 are set as a split-type structure which is merged together, and specific steps of the setting are as follows:

31) in a process that the mold halves of the mold and the pre-molding template are closed, the mold halves of the mold extrude the parisons to the auxiliary male molds in the pre-molding template, and after the parisons contact the auxiliary male molds, the parisons are stretched, that is, to perform pre-stretching on the parisons for the first time; and 32) after the mold halves of the mold and the pre-molding template are closed, the parisons are adsorbed in the mold in vacuum, and at the same time of the adsorption, an actuating mechanism drives the auxiliary male molds to move toward a direction of an inner wall of a mold cavity, so as to perform pre-stretching on the parisons for the second time.

In the foregoing technical solution, the auxiliary male molds in the pre-molding template are set as a split-type structure which is merged together, and the actuating mechanism includes an air cylinder, an oil cylinder or an electromotive mechanism. In the process of closing the mold halves of the mold and the pre-molding template, auxiliary stretching is performed on the molten parisons by using the split-type auxiliary male molds which are merged integrally, and the process of performing auxiliary stretching for the first time is already completed; when the mold halves of the mold and the pre-molding template are completely closed, the split-type auxiliary male molds are opened to push the parisons to move to the inner wall of the mold cavity, and the auxiliary stretching is performed for the second time; after stretching is performed twice, a better auxiliary stretching function is obtained, so that the wall thickness distribution is better and more uniform, and a fuel tank with a complex shape and a larger stretching ratio is better molded.

As an improvement of the present invention, after the internal high-pressure blow molding is performed and the pre-molding is completed in the step 4, and before the mold is opened, the method further includes the following step: 41) returning, by the auxiliary male molds, to an initial location under driving of the actuating mechanism. The technical solution is mainly directed to that the auxiliary male molds are set as a split-type structure, and after the auxiliary male molds complete the stretching for the parisons, the auxiliary male molds return to the initial location, so that subsequent steps continue to be performed.

As an improvement of the present invention, the auxiliary male molds are made of one of polytetrafluoroethylene and an epoxy resin or a combination thereof. When the auxiliary male molds attach and push the parisons, it is generally required that the temperature of the parisons cannot be rapidly reduced, so the auxiliary male molds are preferably made of a material with a low heat conduction coefficient. Because the temperature of the contacted molten parisons may generally be required to be a high temperature of 190° C., the material should further have a high-temperature resistance performance. For example, an engineering material such as polytetrafluoroethylene, an epoxy resin, or a woody material can satisfy the material performance requirement of the mechanism.

As an improvement of the present invention, the molding method further includes a step of blanking the sheet-shaped parisons, and the blanking step is performed before the internal high-pressure blow molding is performed in the step 4 or at the same time when the high-pressure blow molding is performed; after the mold halves of the mold and the pre-molding template are closed, the sheet-shaped parisons may be blanked; the blanking of the molten parisons is performed by using an external cutting method or a method of closing a neck mold and a mold core, so as to prepare for consecutive production.

After the pre-molding template with the auxiliary male molds is withdrawn from the intermediate location of the mold, a built-in component and pre-molded parisons are connected, and in the step, a robot arm first moves a clamped component built-in mechanism with a built-in part to a location which is between the mold halves and needs the built-in part. In the process of internally setting a component, because a large pushing force is required, a mechanical structure may be adopted to fix the component built-in mechanism, so as to play roles of enhancing the rigidity of the component built-in mechanism, preventing the shaking in the process of internally setting a component, improving the location precision of internally setting a component, and improving the built-in connection quality. The built-in part generally includes a valve tube assembly, an oil and gas separating apparatus, a donkey pump sensor, a dashboard, a pipe clamp holder and the like. The robot arm is provided with a push apparatus such as an air cylinder, an oil cylinder or a motor, which is used to connect a built-in part to parisons inside a mold cavity, and this connection may be in a welding, melting or riveting manner; when the welding or melting technique is adopted, hot plate or infrared preheating needs to be performed previously, so as to better achieve the connection performance.

After the component built-in mechanism performs the built-in part connection by using the robot arm, the mechanism is withdrawn from the intermediate location of the mold, and the two-piece mold is finally closed; after the closing, high-pressure blow molding is again performed, so as to perform melting on the upper and lower housings, and obtain a plastic fuel tank with a built-in part.

Compared with the prior art, the present invention has advantages as follows: the present invention provides a method for performing blow molding on a plastic hollow body with two parisons, particularly, a plastic fuel tank, and performs a connection between a large-scale built-in component and the inner wall of the fuel tank. In the method for manufacturing a plastic fuel tank with a large stretching ratio and uniform wall thickness distribution, by using the auxiliary male molds in the pre-molding process where the mold halves of the mold and the pre-molding template are closed, auxiliary stretching is performed on an area where the parisons are stretched greatly, so that the limitation of the system for controlling the wall thickness of two parisons is offset; even if the structure of the fuel tank is complex, by means of the auxiliary stretching of the auxiliary male molds, it can also be ensured that the fuel tank is better and more uniform in the wall thickness distribution and larger in the stretching ratio, so that a larger design freedom is achieved for the shape of the fuel tank, thereby ensuring higher product molding quality.

BRIEF DESCRIPTION OF THE DRAWINGS

The present invention will become more fully understood from the detailed description given herein below for illustration only, and thus are not limitative of the present invention, and wherein.

In the drawings: 1 represents a parison, 2 represents a mold halve of a mold, 3 represents a pre-molding template, 4 represents an auxiliary male mold, 5 represents a robot arm, 6 represents a component built-in mechanism, 7 represents a base, and 8 represents a fuel tank.

DETAILED DESCRIPTION OF THE INVENTION

In order to deepen understanding and knowing for the present invention, the present invention is further described and introduced below with reference to accompanying drawings and specific implementation manners.

Embodiment 1

Figure 1:
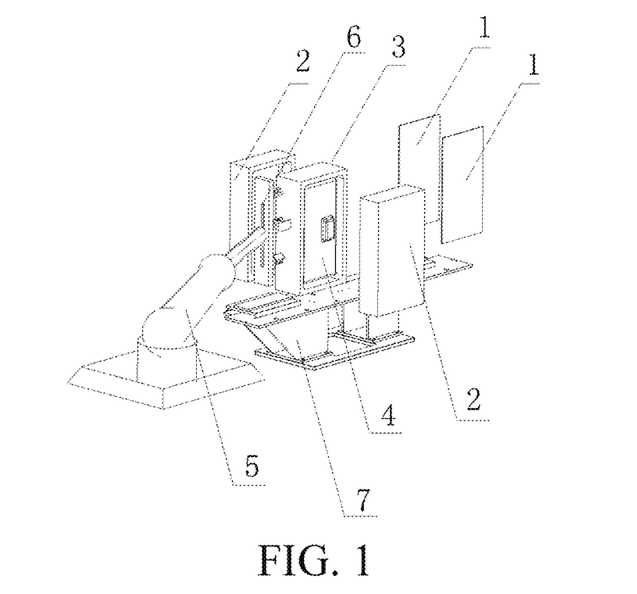
FIG. 1 is a schematic diagram of blanking of two plastic parisons and device tooling.

Referring to FIG. 1 to FIG. 12, a method for molding a two-piece blow molded hollow tank by using auxiliary male molds, where the molding method includes the following steps:

1) Blank two parisons 1, where the two parisons 1 after being blanked are separately located at an intermediate location between mold halves 2 of a two-piece mold and a pre-molding template 3, and for details, reference is made to FIG. 1.

Figure 2:
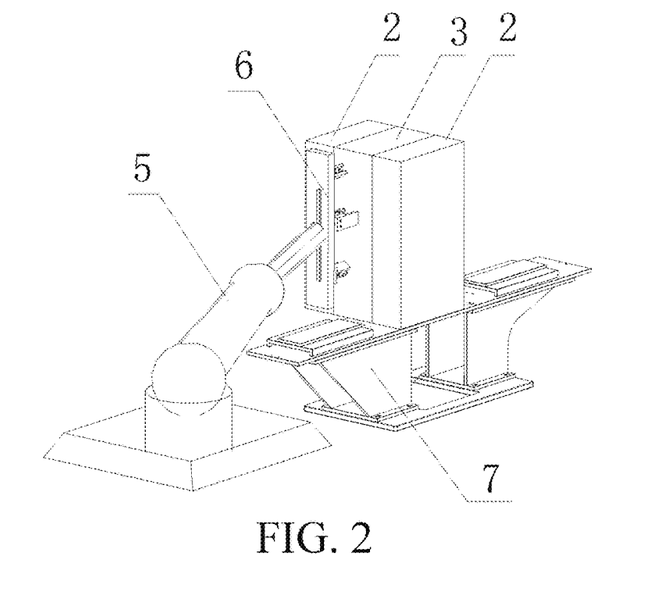
FIG. 2 is a schematic diagram of closing and blanking mold halves of a mold and a pre-molding template, and pre-molding a housing through high-pressure blowing.

2) Close the mold halves 2 of the mold and the pre-molding template 3, where reference is made to FIG. 2.

3) Pre-stretch the molten parisons by using auxiliary male molds 4 in the pre-molding template 3.

4) Perform internal high-pressure blow molding, and pre-mold two housing portions.

Figure 3:
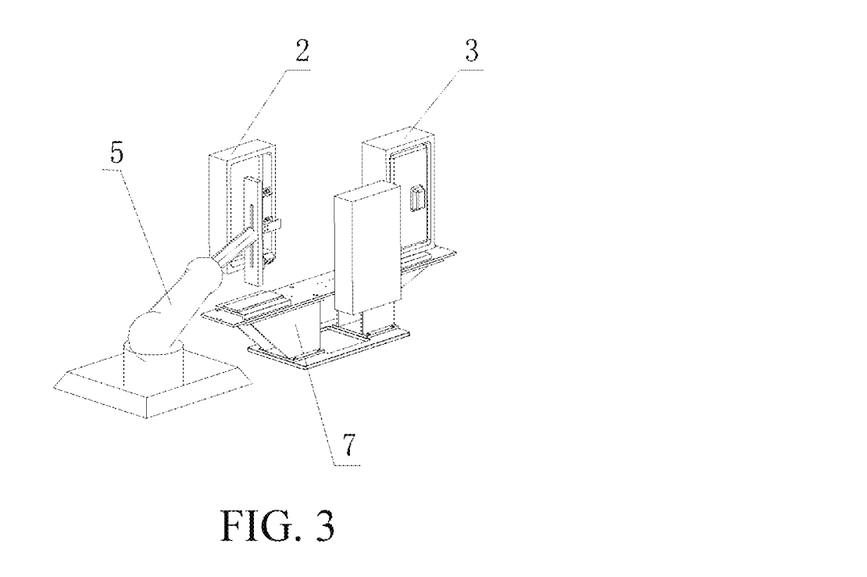
FIG. 3 is a schematic diagram of opening the mold, and withdrawing the pre-molding template.

5) Open the mold halves 2 of the mold and withdraw the pre-molding template 3, where reference is made to FIG. 3.

Figure 4:
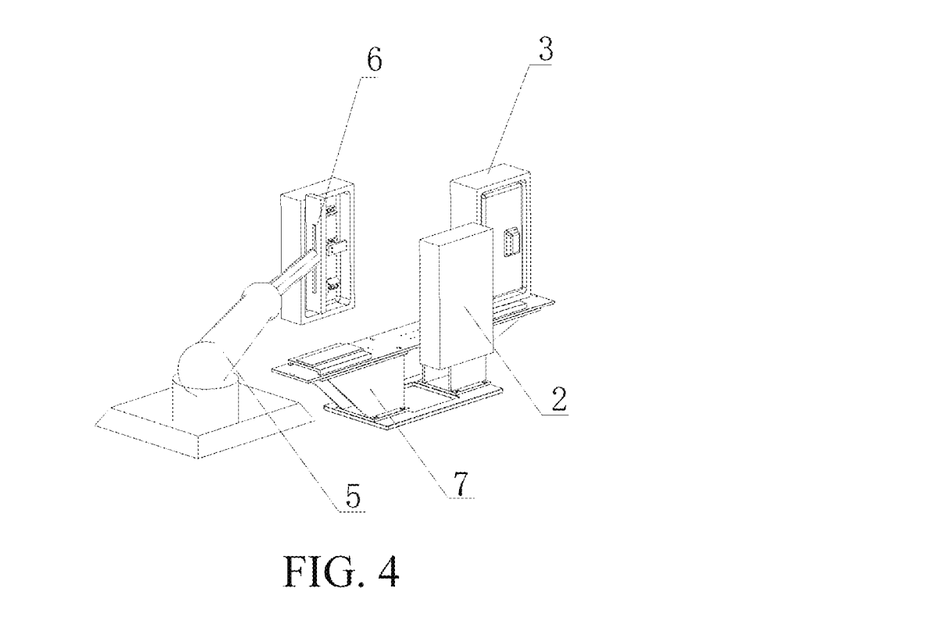
FIG. 4 is a schematic diagram of moving in a component built-in mechanism to perform built-in component connection.
Figure 5:
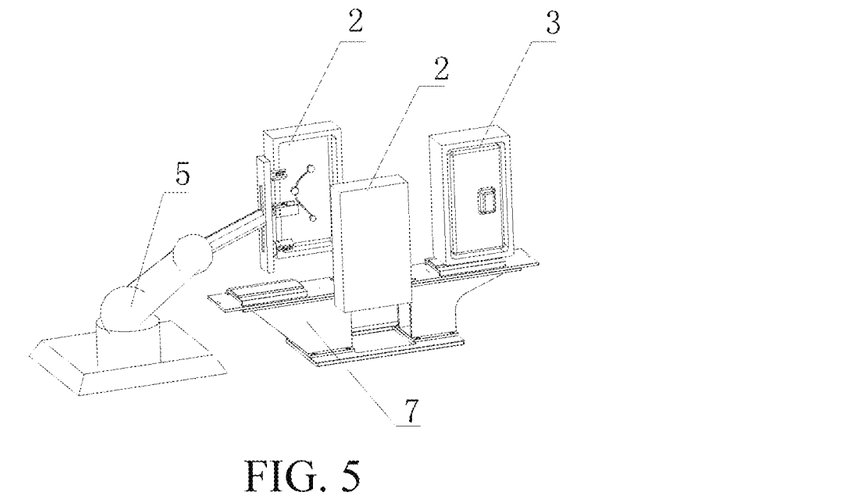
FIG. 5 is a schematic diagram of moving out the component built-in mechanism after a connection between a built-in part and a fuel tank housing is completed.
Figure 6:
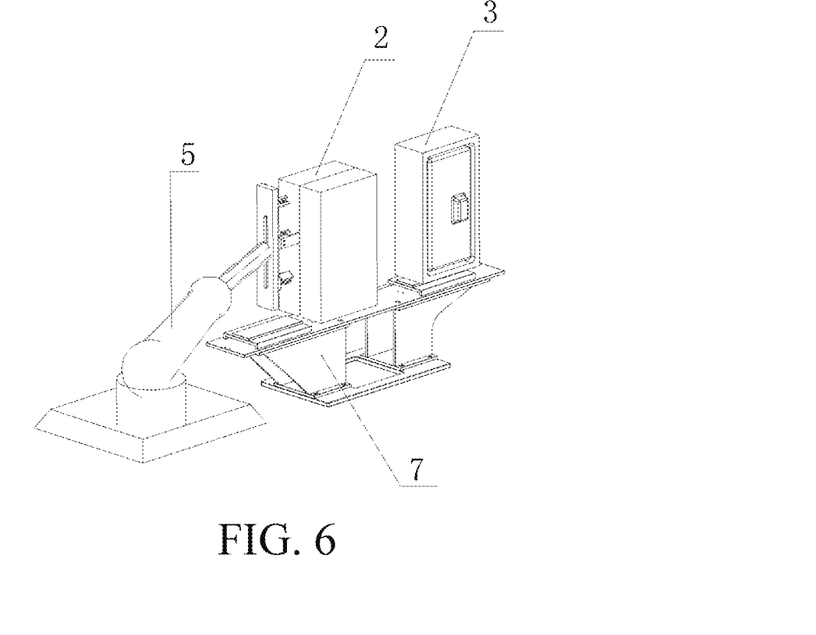
FIG. 6 is a schematic diagram of closing the mold halves of the mold for the second time.
Figure 7:
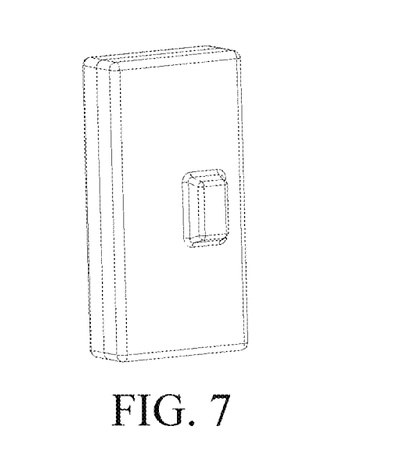
FIG. 7 is a schematic structural diagram of a molded fuel tank which is taken out after the mold is opened.
Figure 8:
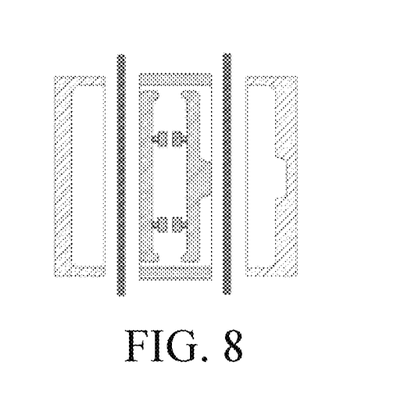
FIG. 8 is a schematic diagram of relative locations between a pre-molding template by using auxiliary male molds, parisons, and a mold.
Figure 9:
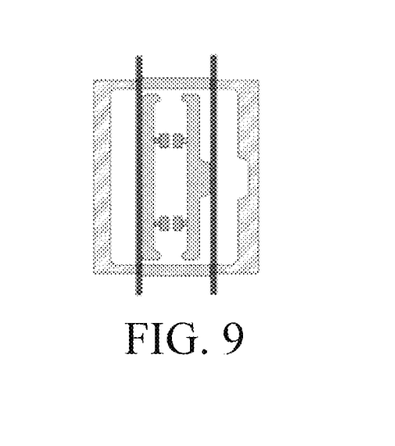
FIG. 9 shows a state occurring when the pre-molding template with the auxiliary male molds, the parisons, and the mold are closed.

6) Move in a component built-in mechanism 6 to perform built-in component connection, where reference is made to FIG. 4. After the pre-molding template 3 with the auxiliary male molds 4 is withdrawn from the intermediate location of the mold, a built-in component and the pre-molded parisons are connected, and in the step, a robot arm 5 first moves a clamped component built-in mechanism 6 with a built-in part to a location which is between the mold halves and needs the built-in part. In the process of internally setting a component, because a large pushing force is required, a mechanical structure may be adopted to fix the component built-in mechanism, so as to play roles of enhancing the rigidity of the component built-in mechanism, preventing the shaking in the process of internally setting a component, improving the location precision of internally setting a component, and improving the built-in connection quality. The built-in part generally includes a valve tube assembly, an oil and gas separating apparatus, a donkey pump sensor, a dashboard, a pipe clamp holder and the like. The robot arm is provided with a push apparatus such as an air cylinder, an oil cylinder or a motor, which is used to connect a built-in part to parisons inside a mold cavity, and this connection may be in a welding, melting or riveting manner; when the welding or melting technique is adopted, hot plate or infrared preheating needs to be performed previously, so as to better achieve the connection performance. 7) Move out the component built-in mechanism 6, where reference is made to FIG. 5. 8) Close the mold halves 2 of the mold for the second time and finally blow molding a hollow tank, where reference is made to FIG. 6. 9) Open the mold and take out the product. Referring to FIG. 7, after the component built-in mechanism performs the built-in part connection by using the robot arm, the mechanism is withdrawn from the intermediate location of the mold, and the two-piece mold is finally closed; after the closing, high-pressure blow molding is again performed, so as to perform melting on the upper and lower housings, and obtain a plastic fuel tank 8 with a built-in part.

In the solution, by using the auxiliary male molds 4, auxiliary stretching is performed on an area where parisons are stretched greatly, the limitation of the system for controlling the wall thickness of two parisons is offset, and a plastic fuel tank with a large stretching ratio and uniform wall thickness distribution is molded; even if the structure of the fuel tank is complex, by means of the auxiliary stretching of the auxiliary male molds, it can also be ensured that the fuel tank is better and more uniform in the wall thickness distribution and larger in the stretching ratio, so that a larger design freedom is achieved for the shape of the fuel tank, thereby ensuring higher product molding quality.

Embodiment 2

Figure 10:
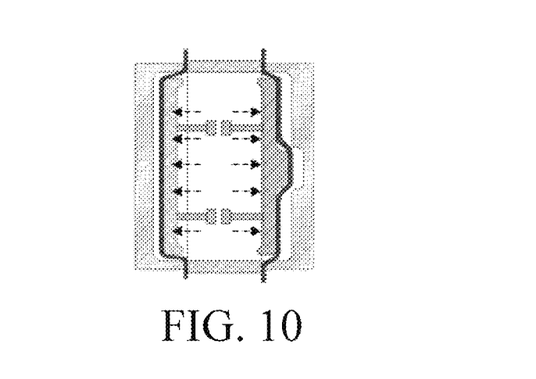
FIG. 10 is a schematic diagram where the split-type auxiliary male molds in the pre-molding template push the parisons and pre-stretch the parisons.
Figure 11:
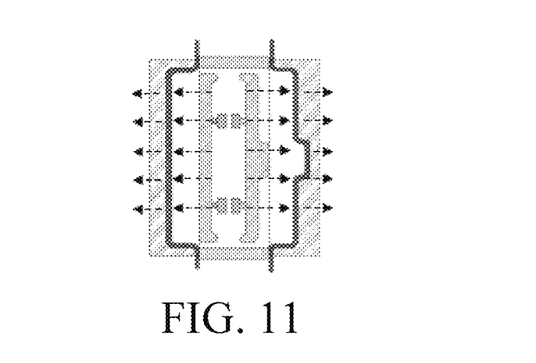
FIG. 11 is a schematic diagram where the parisons are molded through high-pressure blowing and two male molds are folded to an initial location.
Figure 12:
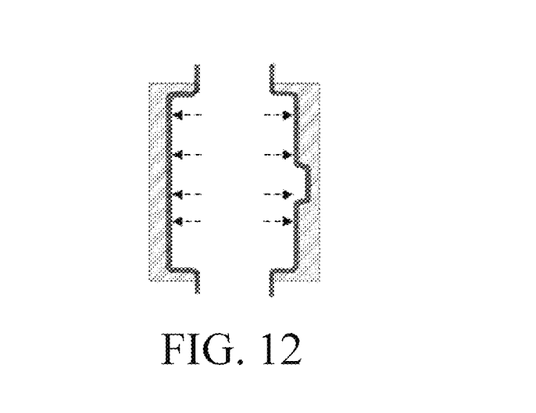
FIG. 12 is a schematic diagram where after the mold is opened and the pre-molding template with the auxiliary male molds is withdrawn from, the two parisons attach the mold.

Referring to FIG. 10, as an improvement of the present invention, the auxiliary male molds 4 on the pre-molding template in the step 3 are set as a split-type structure, and a specific step of the setting is as follows: 31) after the mold halves 2 of the mold and the pre-molding template 3 are closed, an actuating mechanism drives the auxiliary male molds 4 to move toward a direction of an inner wall of a mold cavity, so as to perform pre-stretching on the parisons, where the actuating mechanism includes an air cylinder, an oil cylinder or an electromotive mechanism. The actuating mechanism includes an air cylinder, an oil cylinder or an electromotive mechanism. The actuating mechanism drives the auxiliary male molds to move toward the direction of the inner wall of the mold cavity, and the molten parisons are pre-stretched under push of the auxiliary male molds, so as to perform pre-stretching on the parisons; the pre-stretching is performed on the parisons by using the auxiliary male molds 4, and when the auxiliary male molds 4 move to the inner wall of the mold cavity, a required parison area is first pre-stretched by using the auxiliary male molds, once the parisons contact the auxiliary male molds, because the molten parisons are pre-stretched under the action of good sliding and friction behaviors between the molten parisons and the auxiliary male molds, good wall thickness distribution can be kept, so as to overcome the problem in the prior art that wall thicknesses of places where the parisons are stretched greatly are inconsistent and mold a fuel tank with a more complex shape and a larger stretching ratio. While the mold cavity is vacuumized, the molten parisons are pushed to move to the inner wall of the mold cavity to pre-stretch the parisons. After the pre-stretching action is completed, the parisons inside the fuel tank begin to be subjected to blow molding by using a high-pressure gas, so that the parisons attach the inner surface of the mold cavity, so as to obtain two housing portions attaching the inner sides of the mold halves of the mold. The rest results and advantages are completely the same as those in Embodiment 1.

Embodiment 3

Referring to FIG. 10, further, as an improvement of the present invention, the auxiliary male molds 4 in the pre-molding template 3 in the step 3 are set as a split-type structure, and a specific step of the setting is as follows: 31) after the mold halves 2 of the mold and the pre-molding template 3 are closed, the parisons are adsorbed in the mold in vacuum, and at the same time of the adsorption, an actuating mechanism drives the auxiliary male molds 4 to move toward a direction of an inner wall of a mold cavity, so as to perform pre-stretching on the parisons, where the actuating mechanism includes an air cylinder, an oil cylinder or an electromotive mechanism. The actuating mechanism drives the auxiliary male molds to move toward the direction of the inner wall of the mold cavity, and the molten parisons are pre-stretched under push of the auxiliary male molds 4, so as to perform pre-stretching on the parisons; the pre-stretching is performed on the parisons by using the auxiliary male molds 4, and when the auxiliary male molds 4 move to the inner wall of the mold cavity, a required parison area is first pre-stretched by using the auxiliary male molds 4, once the parisons contact the auxiliary male molds 4, because the molten parisons are pre-stretched under the action of good sliding and friction behaviors between the molten parisons and the auxiliary male molds, good wall thickness distribution can be kept, so as to overcome the problem in the prior art that wall thicknesses of places where the parisons are stretched greatly are inconsistent and mold a fuel tank with a more complex shape and a larger stretching ratio. While the mold cavity is vacuumized, the molten parisons are pushed to move to the inner wall of the mold cavity to pre-stretch the parisons. After the pre-stretching action is completed, the parisons inside the fuel tank begin to be subjected to blow molding by using a high-pressure gas, so that the parisons attach the inner surface of the mold cavity, so as to obtain two housing portions attaching the inner sides of the mold halves of the mold. The rest results and advantages are completely the same as those in Embodiment 1.

Embodiment 4

As an improvement of the present invention, the auxiliary male molds 4 in the pre-molding template 3 in the step 3 are set as an integral-type structure, and specific steps of the setting are as follows: 31) in a process that the mold halves 2 of the mold and the pre-molding template 3 are closed, the mold halves 2 of the mold extrude the parisons to the auxiliary male molds 4 in the pre-molding template 3, and after the parisons contact the auxiliary male molds 4, the parisons are stretched, that is, to perform pre-stretching on the parisons; and 32) after the mold halves 2 of the mold and the pre-molding template 3 are closed, the sheet-shaped parisons are blanked. In the technical solution, after the pre-molded mold halves of the mold and the pre-molding template are completely closed, the auxiliary stretching process is completed, and this auxiliary stretching is performed mainly because the mold halves of the mold extrude the parisons to the auxiliary male molds in the pre-molding template; once the parisons contact the auxiliary male molds, because the molten parisons are pre-stretched under the action of good sliding and friction behaviors between the molten parisons and the auxiliary male molds, good wall thickness distribution can be kept, and a fuel tank with a complex shape and a large height can be better molded, so as to better satisfy the minimum wall thickness requirement of the places where the parisons are stretched greatly. The rest results and advantages are completely the same as those in Embodiment 1.

Embodiment 5

Further, as an improvement of the present invention, the auxiliary male molds 4 in the pre-molding template 3 in the step 3 are set as an integral-type structure, and the setting further includes the following step: 33) after the blanking, adsorbing the parisons in the mold in vacuum. The vacuum adsorption is made in order to better ensure the uniformity of the wall thickness distribution, so as to better mold a fuel tank with a complex shape and a large height, and better satisfy the minimum wall thickness requirement of the places where the parisons are stretched greatly. The rest results and advantages are completely the same as those in Embodiment 1.

Embodiment 6

As an improvement of the present invention, the auxiliary male molds 4 on the pre-molding template in the step 3 are set as a split-type structure which is merged together, and a specific step of the setting is as follows: 31) after the mold halves 2 of the mold and the pre-molding template 3 are closed, the parisons are adsorbed in the mold in vacuum, and at the same time of the adsorption, an actuating mechanism drives the auxiliary male molds to move toward a direction of an inner wall of a mold cavity, so as to perform pre-stretching on the parisons. In the process, when the mold halves of the mold and the pre-molding template are completely closed, the split-type auxiliary male molds are opened to push the parisons to move to the inner wall of the mold cavity, and the auxiliary stretching is performed for the first time, so as to obtain a better auxiliary stretching function, so that the wall thickness distribution is better and more uniform, and a fuel tank with a complex shape and a larger stretching ratio is better molded. The rest results and advantages are completely the same as those in Embodiment 1.

Embodiment 7

Further, as an improvement of the present invention, the auxiliary male molds 4 on the pre-molding template in the step 3 are set as a split-type structure which is merged together, and specific steps of the setting are as follows: 31) in a process that the mold halves 2 of the mold and the pre-molding template 3 are closed, the mold halves of the mold extrude the parisons to the auxiliary male molds in the pre-molding template, and after the parisons contact the auxiliary male molds, the parisons are stretched, that is, to perform pre-stretching on the parisons for the first time; and 32) after the mold halves 2 of the mold and the pre-molding template 3 are closed, the parisons are adsorbed in the mold in vacuum, and at the same time of the adsorption, an actuating mechanism drives the auxiliary male molds to move toward a direction of an inner wall of a mold cavity, so as to perform pre-stretching on the parisons for the second time.

In the foregoing technical solution, the auxiliary male molds in the pre-molding template are set as a split-type structure which is merged together, and the actuating mechanism includes an air cylinder, an oil cylinder or an electromotive mechanism. In the process of closing the mold halves of the mold and the pre-molding template, auxiliary stretching is performed on the molten parisons by using the split-type auxiliary male molds which are merged integrally, and the process of performing auxiliary stretching for the first time is already completed; when the mold halves of the mold and the pre-molding template are completely closed, the split-type auxiliary male molds are opened to push the parisons to move to the inner wall of the mold cavity, and the auxiliary stretching is performed for the second time; after stretching is performed twice, a better auxiliary stretching function is obtained, so that the wall thickness distribution is better and more uniform, and a fuel tank with a complex shape and a larger stretching ratio is better molded. The rest results and advantages are completely the same as those in Embodiment 1.

Embodiment 8

As an improvement of the present invention, after the internal high-pressure blow molding is performed and the pre-molding is completed in the step 4, and before the mold is opened, the method further includes the following step: 41) returning, by the auxiliary male molds 4, to an initial location under driving of the actuating mechanism. The technical solution is mainly directed to that the auxiliary male molds are set as a split-type structure, and after the auxiliary male molds complete the stretching for the parisons, the auxiliary male molds return to the initial location, so that subsequent steps continue to be performed. The rest results and advantages are completely the same as those in Embodiment 1.

Embodiment 9

As an improvement of the present invention, the auxiliary male molds 4 are made of one of polytetrafluoroethylene and an epoxy resin or a combination thereof. When the auxiliary male molds attach and push the parisons, it is generally required that the temperature of the parisons cannot be rapidly reduced, so the auxiliary male molds are preferably made of a material with a low heat conduction coefficient. Because the temperature of the contacted molten parisons may generally be required to be a high temperature of 190° C., the material should further have a high-temperature resistance performance. For example, an engineering material such as polytetrafluoroethylene, an epoxy resin, or a woody material can satisfy the material performance requirement of the mechanism. The rest results and advantages are completely the same as those in Embodiment 1.

Embodiment 10

As an improvement of the present invention, the molding method further includes a step of blanking the sheet-shaped parisons, and the blanking step is performed before the internal high-pressure blow molding is performed in the step 4 or at the same time when the high-pressure blow molding is performed; after the mold halves of the mold and the pre-molding template are closed, the sheet-shaped parisons may be blanked; the blanking of the molten parisons is performed by using an external cutting method or a method of closing a neck mold and a mold core, so as to prepare for consecutive production. The rest results and advantages are completely the same as those in Embodiment 1.

According to needs, in the present invention, at least one of the technical features of Embodiments 2, 3, 4, 5, 6, 7, 8, 9, and 10 may be further combined with that of Embodiment 1 to form a new implementation manner. It should be noted that, the foregoing embodiments are merely preferable embodiments of the present invention, but are not intended to limit the protection scope of the present invention, equivalent replacements or substitutes made based on the foregoing description all fall within the protection scope of the present invention, and the protection scope of the present invention is subject to the claims.

What is claimed is:

1. A method for blow molding a hollow tank formed by two parisons by using auxiliary male molds, wherein the method comprises the following steps:
   1) positioning the two parisons of the tank to be blow-molded into a mold, the mold comprising two half molds and a pre-molding template between the two half-molds, wherein the two parisons of the tank to be blow-molded are positioned between the two half molds and the pre-molding template respectively;
   2) closing the two half molds of the mold onto the pre-molding template;
   3) pre-stretching the molten parisons by using the auxiliary male molds provided on the pre-molding template;
   4) performing high-pressure blow molding inside the mold to melt the two parisons, and pre-molding the molten parisons into two housing pieces;
   5) opening the mold, and withdrawing the pre-molding template;
   6) moving into the mold a device for facilitating inside components of the hollow tank to be connected to the pre-molded housing pieces;
   7) moving the device out from the mold;
   8) closing the mold for the second time and finishing blow molding the hollow tank; and
   9) opening the mold and taking out the molded hollow tank;
   wherein the auxiliary male molds provided on the pre-molding template are set as a split-type structure, and
   wherein step 3) further comprises a specific step of as follows:
   3-1) after the two half molds of the mold are closed, the parisons are sucked into the mold by vacuum force, and at the same time an actuating mechanism drives the auxiliary male molds to move toward an inner wall of the mold, so as to perform pre-stretching on the parisons; and
   wherein in the step 6, a robot moves the device together with the inside components to a location that is between the two half mold and
   where the connection of the inside component to the pre-molded housing pieces shall be performed.

2. The method according to claim 1, wherein after the high-pressure blow molding is performed and the pre-molding is completed at the step 4, and before the mold is opened, the method further comprises the following step:
4-1) the actuating mechanism driving the auxiliary male molds to return to an initial location thereof.

3. The method according to claim 1, wherein the auxiliary male molds are made of one of polytetrafluoroethylene, an epoxy resin and a woody material or a combination thereof.

4. The method according to claim 1, wherein the parisons are sheet-shaped and wherein the method further comprises a step of cutting the sheet-shaped parisons before the internal high-pressure blow molding is performed in the step 4 or at the same time when the high-pressure blow molding is performed.

5. The method according to claim 1, wherein the auxiliary male molds are made of one of polytetrafluoroethylene, an epoxy resin and a woody material or a combination thereof.

6. The method according to claim 1, wherein the method further comprises a step of cutting the sheet-shaped parisons before the internal high-pressure blow molding is performed in the step 4 or at the same time when the high-pressure blow molding is performed.

7. A method for blow molding a hollow tank formed by two parisons by using auxiliary male molds, wherein the method comprises the following steps:
   1) positioning the two parisons of the tank to be blow-molded into a mold, the mold comprising two half molds and a pre-molding template between the two half-molds, wherein the two parisons of the tank to be blow-molded are positioned between the two half molds and the pre-molding template respectively;
   2) closing the two half molds of the mold onto the pre-molding template;
   3) pre-stretching the molten parisons by using the auxiliary male molds provided on the pre-molding template;
   4) performing high-pressure blow molding inside the mold to melt the two parisons, and pre-molding the molten parisons into two housing pieces;
   5) opening the mold, and withdrawing the pre-molding template;
   6) moving into the mold a device for facilitating inside components of the hollow tank to be connected to the pre-molded housing pieces;
   7) moving the device out from the mold;
   8) closing the mold for the second time and finishing blow molding the hollow tank; and
   9) opening the mold and taking out the molded hollow tank;
   wherein the auxiliary male molds provided on the pre-molding template are set as a split-type structure which is merged together, and
   wherein step 3) further comprises the specific steps as follows:
   3-1) when the two half molds, of the mold are closed onto the pre-molding template, the two half molds extrude the parisons to the auxiliary male molds provided on the pre-molding template, and after the parisons contact the auxiliary male molds, pre-stretching of the parisons is performed for a first time; and
   3-2) after the two half molds are closed onto the pre-molding template, the parisons are sucked into the mold by vacuum force, and at the same time an actuating mechanism drives the auxiliary male molds to move toward an inner wall of the mold, so as to perform pre-stretching on the parisons for a second time; and
   wherein in the step 6, a robot moves the device together with the inside components to a location that is between the two half molds and where the connection of the inside component to the pre-molded housing pieces shall be performed.

8. The method according to claim 7, wherein after the high-pressure blow molding is performed and the pre-molding is completed at the step 4, and before the mold is opened, the method further comprises the following step:
4-1) the actuating mechanism driving the auxiliary male molds to return to an initial location thereof.

9. The method according to claim 7, wherein the auxiliary male molds are made of one of polytetrafluoroethylene, an epoxy resin and a woody material or a combination thereof.

10. The method according to claim 7, wherein the parisons are sheet-shaped and wherein the method further comprises a step of cutting the sheet-shaped parisons before the high-pressure blow molding is performed at the step 4 or at the same time when the high-pressure blow molding is performed.

* * * * *